(12) United States Patent
Köhler et al.

(10) Patent No.: US 6,998,149 B2
(45) Date of Patent: Feb. 14, 2006

(54) PROCESS FOR PRODUCING A MEMBRANE ELECTRODE ASSEMBLY FOR FUEL CELLS

(75) Inventors: Joachim Köhler, Burchköbel (DE); Karl-Anton Starz, Rodenbach (DE); Sandra Wittpahl, Obertshausen (DE); Manfred Diehl, Frankfurt (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 355 days.

(21) Appl. No.: 09/973,193

(22) Filed: Oct. 10, 2001

(65) Prior Publication Data
US 2002/0064593 A1 May 30, 2002

(30) Foreign Application Priority Data
Oct. 12, 2000 (DE) .......................... 100 50 467

(51) Int. Cl.
*B05D 5/12* (2006.01)
*H01M 4/88* (2006.01)

(52) U.S. Cl. ............... 427/115; 427/384; 427/407.1; 502/101

(58) Field of Classification Search ............... 427/115, 427/384, 407.1; 429/30, 42; 502/101
See application file for complete search history.

(56) References Cited

U.S. PATENT DOCUMENTS

| | | | |
|---|---|---|---|
| 4,876,115 A | * | 10/1989 | Raistrick .................. 427/115 |
| 5,761,793 A | | 6/1998 | Bevers et al. |
| 5,861,222 A | | 1/1999 | Fischer et al. |
| 6,015,635 A | * | 1/2000 | Kawahara .................. 429/42 |
| 6,074,692 A | | 6/2000 | Hulett |
| 6,156,449 A | | 12/2000 | Zuber et al. |
| 6,383,556 B1 | * | 5/2002 | Lott et al. .................. 427/115 |
| 6,645,336 B1 | * | 11/2003 | Albertone et al. ... 427/407.1 X |
| 2002/0064593 A1 | | 5/2002 | Köhler et al. |

FOREIGN PATENT DOCUMENTS

| | | |
|---|---|---|
| EP | 0 731 520 | 11/1996 |
| EP | 785588 | * 7/1997 |
| WO | WO 97/23916 | 7/1997 |
| WO | WO 97/23919 | 7/1997 |
| WO | WO 97/50142 | 12/1997 |

* cited by examiner

*Primary Examiner*—Stephen J. Kalafut
(74) *Attorney, Agent, or Firm*—Kalow & Springut LLP; John Santalone

(57) ABSTRACT

A process for producing a membrane electrode assembly for fuel cells containing a polymer electrolyte membrane having a first and a second surface parallel to each other. The first surface forms a firm composite with a first catalyst layer and a first water repellent gas distribution layer and said second surface form a firm composite with a second catalyst layer and a second water repellent gas distribution layer. The catalyst layers are prepared by using inks containing electrocatalysts, one or more solvents, proton-conducting ionomer and optionally water repelling agents and pore-forming agents. In the process the two catalyst layers are applied to or contacted with the respective surfaces of the polymer electrolyte membrane successively, wherein during the application or contacting process to one surface always the opposite surface of the membrane is supported.

21 Claims, 3 Drawing Sheets

PROCESS FOR PRODUCING A MEMBRANE ELECTRODE ASSEMBLY FOR FUEL CELLS

INTRODUCTION AND BACKGROUND

The present invention provides a process for producing a membrane electrode assembly (MEA) for fuel cells, which is especially suitable for continuous manufacture of membrane electrode assemblies.

A membrane electrode assembly consists of a polymer electrolyte membrane, both faces of which are each provided with a catalyst layer and a gas distribution layer arranged on top of the catalyst layer. One of the catalyst layers is designed as an anode for the oxidation of hydrogen and the second catalyst layer is designed as a cathode for the reduction of oxygen. The gas distribution layers normally consist of carbon fiber paper or carbon fiber fabric and enable good access by the reaction gases to the reaction layers and good conductance of the cell current. The catalyst layers for anode and cathode contain a proton-conducting polymer and so-called electrocatalysts which catalytically support the relevant reaction (oxidation of hydrogen and reduction of oxygen). Metals from the platinum group in the Periodic System of Elements are preferably used as catalytically active components. In the majority of cases so-called supported catalysts are used in which the catalytically active platinum group metals have been applied in highly dispersed form to the surface of a conductive support material. Finely divided carbon blacks have proved useful as support materials.

The polymer electrolyte membrane consists of proton-conducting polymer materials. These materials are also called ionomers for short in the following. A tetrafluoroethylene/fluorovinylether copolymer with sulfonic acid groups is preferably used. This material is marketed, for example, by DuPont under the trade name Nafion®. However, other, in particular fluorine-free, ionomer materials such as sulfonated polyetherketones or arylketones or polybenzimidazoles can also be used. For use in fuel cells, these membranes generally have a thickness between 10 and 200 µm.

The catalyst layers are mostly applied to the polymer electrolyte membranes using a pasty preparation by printing, spreading, rolling or spraying. The pasty preparations are called inks or catalyst inks in the following. In addition to the supported catalyst, they generally contain a soluble proton-conducting material, several solvents and optionally highly dispersed hydrophobic materials and pore-forming agents. Catalyst inks can be differentiated by the type of solvent used. There are inks which contain predominantly organic solvents and those which use predominantly water as the solvent. Thus DE 196 11 510 A1 describes catalyst inks which contain predominantly organic solvents, while EP 0 731 520 A1 describes catalyst inks in which exclusively water is used as the solvent.

The gas distribution layers usually consist of coarse-pored carbon fiber paper or carbon fiber fabric with a porosity of up to 90%. In order to prevent flooding of the pore system with the reaction water being produced at the cathode, these materials are impregnated, for example, with dispersions of polytetrafluoroethylene (PTFE). Calcination at about 340 to 370° C. follows impregnation in order to melt the PTFE material. To improve electrical contact between the catalyst layers and the gas distribution layers, these are often coated, on the surface turned towards the relevant catalyst layer, with a microporous layer consisting of carbon black and a fluorinated polymer, which is porous and water-repellent and at the same time electrically conductive, and in addition has a reasonably smooth surface.

To use fuel cells as sources of electrical energy, many membrane electrode assemblies are arranged on top of each other to form a fuel cell stack. So-called bipolar sheets are introduced in between the individual membrane electrode assemblies and these lead the reaction gases to the electrodes in the fuel cell and lead the reaction products away via corresponding channels. In addition they take on the task of supplying and removing the cell current.

The use of these fuel cell stacks for electrical drive units in motor vehicles requires large-scale production processes for the membrane electrode assemblies.

DE 195 09 749 A1 describes a process for continuous production of a composite of electrode material, catalyst material and a solid electrolyte membrane, wherein a catalyst powder comprising the electrode material, the catalyst material and the solid electrolyte material is used to form a catalytic coating on a carrier. This catalyst layer is heated to soften the solid electrolyte material and rolled out under pressure on the solid electrolyte membrane. This procedure is performed for both faces of the solid electrolyte membrane so that the process provides a complete membrane electrode assembly. The carrier for the catalyst layer acts as a gas distribution layer in the final membrane electrode assembly.

WO 97/50142 describes a continuous process for coating a polymer electrolyte membrane with electrodes, in which a strip-shaped polymer membrane is drawn through a bath of a platinum salt solution. The adhering salt is then reduced to the noble metal in a gas stream or in another bath. This process does not provide complete membrane electrode assemblies.

WO 97/23916 also describes a process for continuous production of material composites, wherein the material composites consist of several functional materials. They may be used, for example, in fuel cells. Liquid preparations which contain the catalyst material (catalyst inks) are used, inter alia, to produce the catalyst layers.

Furthermore, WO 97/23919 describes a process for producing membrane electrode assemblies, wherein linkage of the polymer electrolyte membrane, the electrode layers and the gas diffusion layers is performed continuously in a roller process.

U.S. Pat. No. 6,074,692 also describes a continuous process for simultaneously coating both sides of a polymer electrolyte membrane with catalyst layers, using appropriate catalyst inks, but without the application of gas distribution layers.

The electrochemical performance of membrane electrode assemblies depends, inter alia, on the thickness of the polymer electrode membrane. The thinner the membrane, the lower is its electrical resistance. Currently, membranes with thicknesses of 50 and 100 µm are used for membrane electrode assemblies. Since the membranes become ever more difficult to handle as they become thinner, they are sometimes supplied with a support film on one surface.

An object of the present invention is to provide a more reliable process with which polymer electrolyte membranes, in particular with thicknesses of less than 50 µm, can be processed to give membrane electrode assemblies.

SUMMARY OF THE INVENTION

The above and other objects of the invention can be achieved by a process for producing a membrane electrode assembly for fuel cells containing a polymer electrolyte membrane having a first and a second surface parallel to each other. The first surface forms a firm composite with a first catalyst layer and a first water repellent gas distribution layer and said second surface forming a firm composite with a second catalyst layer and a second water repellent gas distribution layer. The catalyst layers are prepared by using inks containing electrocatalysts, one or more solvents, proton-conducting ionomer and optionally water repelling agents and pore-forming agents. A feature of the process that the two catalyst layers are applied to or contacted with the respective surfaces of the polymer electrolyte membrane successively, wherein during the application or contacting process to one surface, the opposite surface of the membrane is always supported.

The process is concerned with the production of membrane electrode assemblies consisting of a polymer electrolyte membrane with electrodes applied to both faces. The polymer electrolyte membrane is also called the membrane for short in the following. The membrane consists of a proton-conducting ionomer and has a specific thickness. It is limited substantially by two opposite surfaces to which the electrodes for the membrane electrode assembly are applied. The two opposite surfaces of the membrane are called the first and second surfaces of the membrane in the context of this invention. The electrodes for the membrane electrode assembly contain a catalyst layer and a so-called gas distribution layer consisting of a highly porous, electrically conductive, carbon fiber fabric or carbon fiber paper. The thickness of this gas distribution layer is usually between 100 and 400 $\mu$m. The gas distribution layers are water repellent in order to hinder flooding of the pores with the moistening water for the anode and the reaction water at the cathode and thus always to ensure efficient supply and removal of the reaction media to and from the catalyst layers. Water repelling is achieved by impregnation with a PTFE dispersion (for example Hostaflon TF5235 from Dyneon), drying and calcining at temperature higher than 340° C.

The electrodes on the two surfaces of the membrane may be different from each other. They may contain both different catalyst layers and also different gas distribution layers. Therefore, in the context of this invention, the first and second catalyst layer and the first and second gas distribution layer differ from each other. Thus, the anode gas distribution layer contains, in an advantageous manner, a higher concentration of PTFE than the cathode gas distribution layer. The concentration of PTFE in the anode gas distribution layer is preferably about twice as high as in the cathode gas distribution layer. Typical concentrations for PTFE in the anode gas distribution layer are 16 wt. % and in the cathode gas distribution layer are 8 wt. %.

The catalyst layers are porous and consist of the particular electrocatalyst, in general a noble metal supported catalyst such as platinum on carbon black (Pt/C) for the cathode and platinum and ruthenium on carbon black (PtRu/C) for the anode, and a proton-conducting ionomer. A noble metal black may also be used instead of or in combination with a noble metal supported catalyst. To prepare the catalyst layers, the electrocatalyst and the ionomer are carefully blended to give a paste, using solvents. This paste is called an ink in the following. The catalyst ink may also contain pore-forming agents and water repelling agents such as, for example, a PTFE dispersion. In the context of the present invention, a differentiation is made between inks which contain predominantly, that is to say more than 50 wt. %, with respect to the total weight of the ink, organic solvents and those inks which contain predominantly water. Inks which contain predominantly organic solvents are described, for example, in German patent applications DE 196 11 510 A1 and DE 198 10 485 A1 and DE 198 37 669 A1. "Aqueous" inks are disclosed in EP 0 731 520 A1 and in the still unpublished German patent application P 100 37 074.8.

The catalyst layers may be applied directly to the membrane using the inks by means of printing, brushing, spraying or other known coating techniques. Applying the catalyst layers to the membrane by using these techniques is referred to as coating in the context of this invention. Then the gas distribution layers are placed in contact with the catalyst layers. Alternatively, the catalyst layers may first be applied to the gas distribution layers. The coated gas distribution layers may then be placed on the membrane in such a way that their catalyst layer contacts the respective surface of the membrane. This technique is referred to in the following as bringing the catalyst layer into contact with the membrane.

An essential feature of the process according to the invention is that the polymer electrolyte membrane is supported at one surface when the opposite surface is coated with the catalyst layer or is brought into contact with it. This means that the membrane forms an at least temporary, fixed composite with a backing, at least in the entire region of the subsequent electrode. This backing has the task of mainly suppressing warping or distortion of the membrane during coating of the opposite surface with the catalyst layer. Therefore the backing must be resistant to the solvents used in the process and should exhibit only a low degree of swelling due to the effects of the solvents. In the case of a temporary backing, this may be, for example, a backing film of polyester (thickness of the backing film about 50 to 100 $\mu$m) which stabilizes the membrane during application of the first catalyst layer and is pulled off before application of the second catalyst layer. When applying the second catalyst layer, the function of the backing may be taken over by the gas distribution layer applied to the first catalyst layer. For this purpose, a fixed composite between the membrane, the first catalyst layer and the first gas distribution layer must be formed before applying the second catalyst layer.

To perform the process, a membrane is used the first surface of which is preferably readily accessible and the second surface of which is supported by a backing film. In this case, the process includes the following steps:
 a) producing the composite of said first surface with the first catalyst layer and the first water repellent gas distribution layer,
 b) removing the backing film from the second surface of the membrane,
 c) producing the composite of said second surface with the second catalyst layer and the second gas distribution layer.

In a special embodiment of the process, process step a) consists of the following sub-steps:
 a1) coating the first surface of the membrane with the first catalyst layer using a first ink and
 a2) laying the first gas distribution layer on the still moist catalyst layer and drying the composite.

In this case it is advantageous if an ink which contains predominantly organic solvents is used for producing the first catalyst layer. Organic solvents cause much greater swelling of the membrane than water-based inks. The greater degree of swelling then leads to a better bond between the membrane and the catalyst layer. For this reason, in the context of this invention, inks which contain predominantly organic solvents are used in all process steps which provide for direct coating of the membrane with catalyst layers.

Drying the composite is performed at a temperature between 50 and 100, preferably at 70° C., and leads to a firm bond between membrane, first catalyst layer and first gas distribution layer. After drying, the composite can be washed in a water bath at an elevated temperature, preferably at 80° C., in order to wash out any solvents which have not already been fully removed from the catalyst layer.

Process step c), in the same way as step a), can also consist of two sub-steps, these being:
 c1) coating the second surface of the membrane with the second catalyst layer using a second ink and c2) laying the second gas distribution layer on the still moist catalyst layer and drying the composite.

In this case also, the use of an ink which contains predominantly organic solvents is recommended for producing the second catalyst layer.

Instead of the symmetric procedure just described for coating the membrane layer with catalyst layers, it may be advantageous in some cases not to apply the second catalyst layer directly to the membrane but first to lay the second catalyst layer on the second gas distribution layer and then to lay the still moist catalyst layer on the second surface of the membrane. Accordingly, process steps c3) and c4) are then designed as follows:

c3) coating the second gas distribution layer with the second catalyst layer using a second ink and c4) laying the still moist catalyst layer on the second surface of the membrane and drying the composite.

With this procedure, it is advantageous if the ink for producing the second catalyst layer contains predominantly water as solvent. This prevents the ink from penetrating into the pore system of the gas distribution layer during the coating process and having a detrimental effect on the performance of the final fuel cell.

In the case of symmetric direct coating of the membrane with the two catalyst layers using inks based on organic solvents described above, whether the catalyst layer for the subsequent anode is applied first or the catalyst layer for the subsequent cathode is applied first has no effect on the performance of the final fuel cell. In contrast, with the asymmetric variant of the process, it has been observed that the final fuel cell exhibits better electrical performance when not the anode catalyst but the cathode catalyst is applied directly to the polymer electrolyte membrane in step a). In this case, the anode catalyst is thus applied to the second gas distribution layer in step c).

In a further process variant, step c) consists of the following sub-steps c5) and c6):

c5) coating the second gas distribution layer with the second catalyst layer using a second ink and drying the coating and c6) laying the catalyst layer on the second surface of the membrane and d) compressing the entire composite at elevated temperature.

This variant enables coating of the second gas distribution layer with the second catalyst layer in a previous working step and temporarily storing this for subsequent use in the process suggested here. The bond with the membrane is produced by the application of pressure and temperature in this case. The pressure to be applied is preferably between 1 and 100 bar. Good results are produced with a pressure of 70 bar at a temperature of 130° C.

In this case also, the information provided above still holds with regard to the choice of solvent for the catalyst inks and their sequence of application.

The use of pressure and temperature to produce the bond between the membrane and the second gas distribution layer coated with the second catalyst may not be required if the second catalyst layer is moistened with an ionomer solution. In this case, only a drying step at elevated temperature is required to produce the composite.

This procedure may be extended to the case where the two catalyst layers are first applied to the relevant gas distribution layers and that only then is the composite with the membrane produced. In this process variant, therefore, process steps a) and c) consist of the following sub-steps:

a3) coating the first gas distribution layer with the first catalyst layer using a first ink and drying the coating, a4) moistening the first catalyst layer with an organic ionomer solution and a5) laying the moistened first catalyst layer on the first surface of the membrane and drying the composite, c7) coating the second gas distribution layer with the second catalyst layer using a second ink and drying the coating, c8) moistening the second catalyst layer with an organic ionomer solution and c9) laying the moistened second catalyst layer on the second surface of the membrane and drying the composite.

Due to direct coating of the water repellent gas distribution layers with the catalyst layers, the use of inks which contain substantially water as solvent is also recommended in this case.

To improve linkage of the gas distribution layers to the catalyst layers, it is advantageous if the water repellent gas distribution layers are provided with a carbon-containing hydrophobic microporous layer on the areas intended to make contact with the catalyst layers. To prepare the microporous layer, a paste of carbon black and PTFE is used and this is dried and calcined after application to the gas distribution layer. Temperatures between 340 and 370° C. are used for calcination procedure, causing the PTFE to melt. In addition, it may be advantageous for the bond between the catalyst layers and the membrane when the membrane is swollen in water or organic solvents before application of or bringing into contact with the catalyst layers.

The suggested process is suitable for the individual production of membrane electrode assemblies for fuel cells when the electrolyte membranes being used have a thickness of less than 50 $\mu$m. The advantages of the process with regard to simple production of membrane electrode assemblies with thin membranes, however, are especially positive when the process is transferred to a continuous mode of production.

BRIEF DESCRIPTION OF DRAWINGS

The process of the invention is explained in more detail in the following with the aid of examples and the figures. The figures show.

DETAILED DESCRIPTION OF INVENTION

Figure 1:
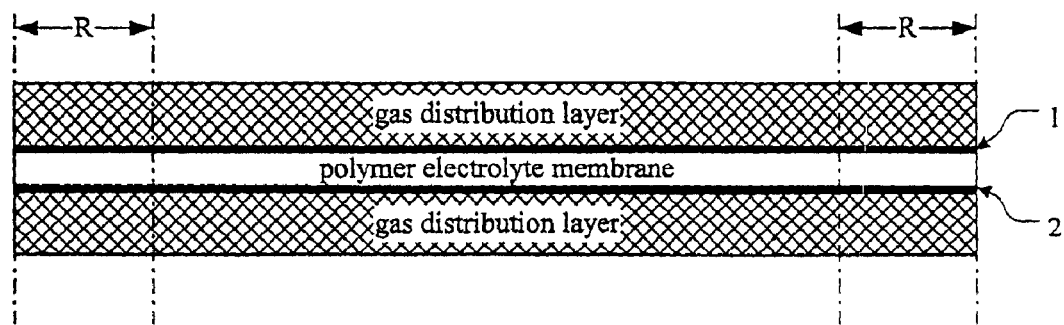
FIG. 1: Layout of a membrane electrode assembly with membrane, catalyst layers and gas distribution layers having the same lateral dimensions.
Figure 2:
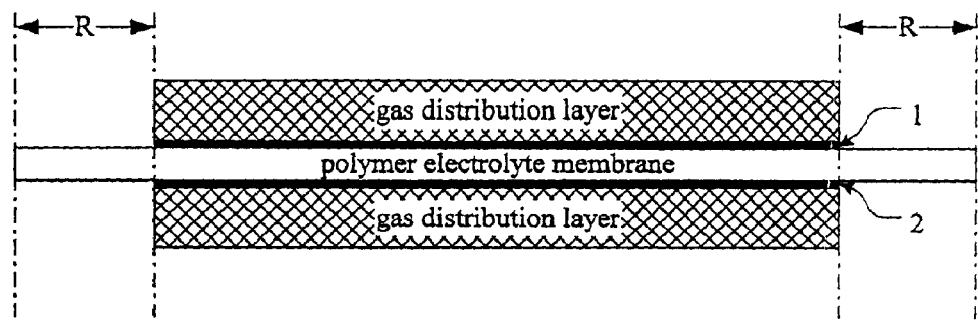
FIG. 2: Layout of a membrane electrode assembly with a membrane projecting over the dimensions of the catalyst layers and the gas distribution layers.

FIGS. 1 and 2 show two different embodiments of membrane electrode assemblies which can be produced by the process of the invention. The catalyst layers are labelled with the reference numbers (1) and (2) in the figures.

FIG. 1 shows a membrane electrode assembly which is obtained when the membrane is brought into contact with catalyst layers and gas distribution layers over its entire area. This may take place, for example, in a simple continuous process. The membrane and the gas distribution layers in this case are used as rolled up goods and are coated over the entire area with catalyst layers and bonded together. The strip-shaped laminate of membrane, catalyst layers and gas distribution layers obtained here is then cut to the size required for the membrane electrode assemblies. Before assembling to form a fuel cell, the membrane electrode assembly must be sealed over a peripheral edge zone, called R in FIG. 1, by impregnation with a polymer or adhesive, in order to prevent the lateral escape of reactive gases.

FIG. 2 shows a membrane electrode assembly in which the membrane is larger than the applied catalyst and gas distribution layers and a peripheral edge is formed, which is also labelled R in FIG. 2. During assembly to form a fuel cell, the membrane electrode assembly is sealed by laying seals on the edge R. For continuous production of membrane electrode assemblies in accordance with FIG. 2 using the process of the invention, the catalyst layers have to be applied to the strip-shaped membrane in the geometric dimensions required for fuel cells by means of screen printing and then said gas distribution layers are laid precisely on the catalyst layers using sheet feeders.

Figure 3:
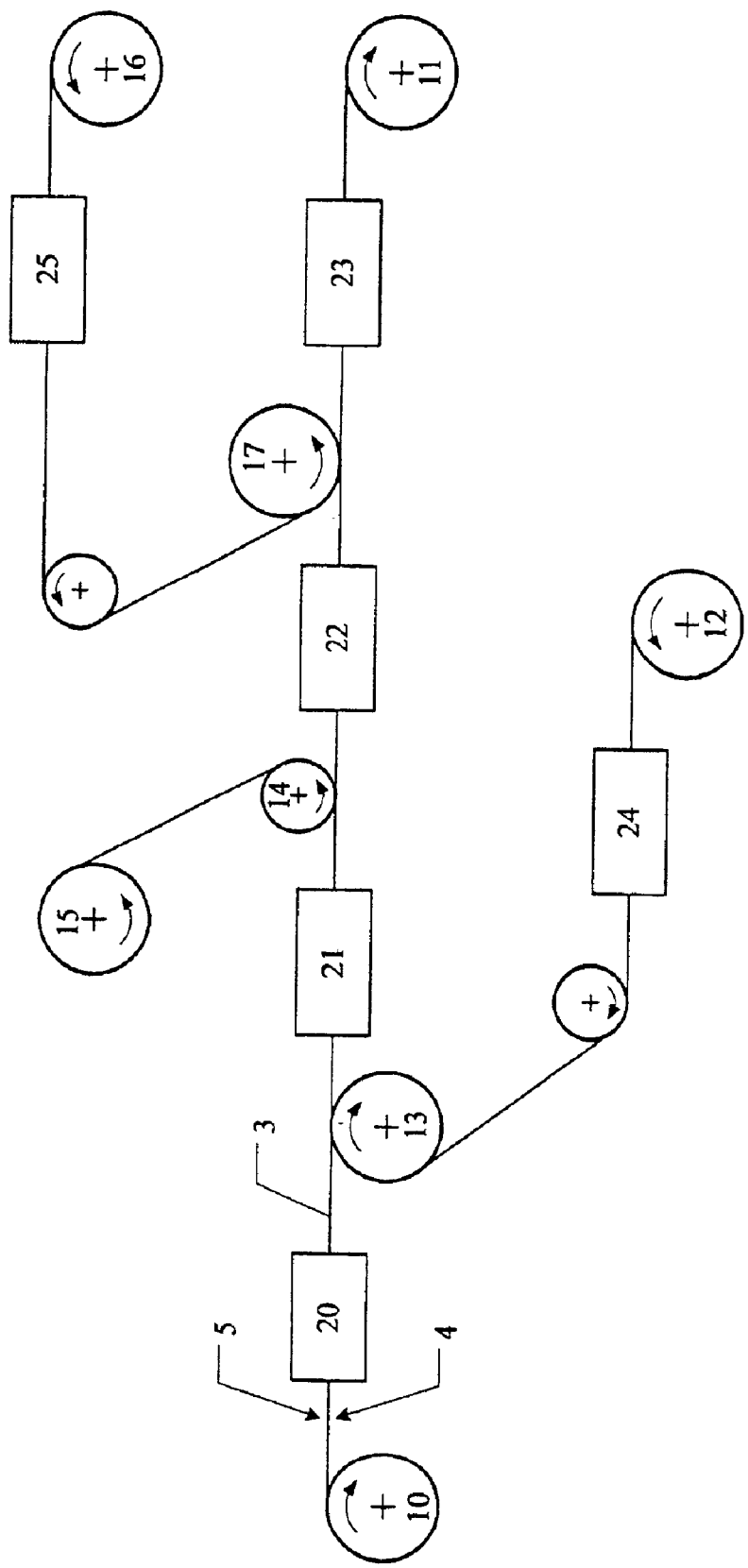
FIG. 3: Principle of the arrangement for continuous production of membrane electrode assemblies.

Use of the process of the invention for the continuous production of membrane electrode assemblies is explained in more detail in FIG. 3. FIG. 3 shows an example of a configuration for a manufacturing unit for the continuous production of membrane electrode assemblies by the process defined herein. The number (3) in FIG. 3 refers to a strip-shaped polymer electrolyte membrane supported on a backing film, this being unwound from roll (10) and, after production of the membrane electrode assembly, rolled onto roll (11). The number (4) refers to the readily accessible first surface of the membrane, while the second surface (5) is supported by a backing film which has been laminated on. (20) to (25) are treatment stations in which various treatments are performed, depending on the actual process variant being applied.

In one possible embodiment of the process, the supported membrane is first swollen in a water bath in treatment station (20) and then coated, over the entire area of the readily accessible first surface (4), with the first catalyst layer. The membrane is supported by the backing film on the second surface of the membrane during this coating process. The first gas distribution layer, in the form of a strip, is unwound from roll (12) and laid on the still moist catalyst layer with the aid of deflection roll (13). In treatment station (21) the catalyst layer is dried at a temperature of about 70° C. and the bond between the first surface of the membrane, the first catalyst layer and the first gas distribution layer is made in that way.

Depending on the vertical range of manufacture required for the process, the gas distribution layer may be hydrophobized and optionally equipped with a microporous layer in treatment station (24) or it may be supplied to the process as rolled goods from roll (12) as a ready-made product already being water repellent and optionally equipped with a microporous layer.

After producing the composite of membrane, first catalyst layer and first gas distribution layer, the membrane is now also supported on its first surface. Therefore the backing film can now be pulled away from the second surface of the membrane, using deflection roll (14), and wound onto roll (15). Then the second catalyst layer is applied to the second surface of the membrane in treatment station (22). During this coating procedure, the membrane is supported on the first surface by the already produced composite with the first gas distribution layer. The second gas distribution layer is then laid on the still moist second catalyst layer using deflection roll (17). The composite of membrane, second catalyst layer and second gas distribution layer is formed by drying the second catalyst layer at about 70° C. in treatment station (23).

The second gas distribution layer is unwound in strip form from roll (16). As in the case of the first gas distribution layer, the second gas distribution layer may be unwound from roll (16) as a ready-made product or first produced from a strip-shaped carbon fiber paper or carbon fiber fabric by making it water repellent and optionally coating with a microporous layer in treatment station (25).

The production unit in FIG. 3 enables, in the context of the present invention, many modifications to the procedure just described. Thus, it is not necessary to also apply the second catalyst layer directly to the second surface of the membrane. Rather, the second catalyst layer can be printed onto the gas distribution layer and then, in the still moist state, be brought into contact with the membrane. In this case, treatment station (25) for the gas distribution layer also includes application of the second catalyst layer to the gas distribution layer.

Likewise, both gas distribution layers may be coated with the relevant catalyst layer and dried in a separate, previous, production step. These catalysed gas distribution layers are supplied to the production unit in FIG. 3 as rolled goods (rolls (12) and (16)). In treatment stations (24) and (25) the catalyst layers are moistened with an organic ionomer solution and then laid on the membrane using rollers (13) and (17). Treatment stations (21) and (23) then contain only drying stations. Treatment station (22) is not required and treatment station (20) in this case contains only a water bath to swell the membrane.

If membrane electrode assemblies in accordance with FIG. 2 are intended to be produced using the production unit in FIG. 3, then the catalyst layers are applied to the membrane in the desired patterns. Supply of the gas distribution layers with the aid of elements (12), (13) and (24) on the one hand and of elements (16), (17) and (25) on the other hand is replaced by suitable single sheet feeders of pre-cut gas distribution layers which are laid very precisely on the catalyst layers. Alternatively, pre-cut gas distribution layers which are already coated with catalyst may be used, these being moistened with an organic ionomer solution before being laid on the membrane, so that a firm bond is formed between the membrane and the catalysed gas distribution layers after drying the ionomer solution.

The following example is intended to illustrate the process according to the invention in more detail.

EXAMPLE 1

Catalyst inks with the following compositions were prepared in order to make up an membrane electrode assembly in accordance with the suggested process:

Composition of the cathode ink:

| | |
|---|---|
| 13.0 g | Pt supported catalyst (40 wt. % Pt on carbon black, Dmc$^2$) |
| 41.0 g | Nafion ® solution (10 wt. % in water) |
| 36.0 g | Water (fully deionised) |
| 10.0 g | Dipropylene glycol |
| 100.0 g | |

Composition of the anode ink:

| | |
|---|---|
| 11.0 g | PtRu supported catalyst (40 wt. % PtRu on carbon black: 26.4 wt. % Pt, 13.6 wt. % Ru; catalyst according to U.S. Pat. No. 6,007,934) |
| 36.0 g | Nafion ® solution (10 wt. % in dipropylene glycol (PG)) |
| 11 g | Water (fully deionised) |
| 42.0 g | Dipropylene glycol |
| 100.0 g | |

The cathode ink mentioned above contains predominantly water as solvent, whereas the anode ink contains substantially dipropylene glycol as solvent.

The Nafion solution (Nafion: tetrafluoroethylene/fluorovinylether copolymer with sulfonic acid groups in the proton form) in dipropylene glycol was prepared from a purchased Nafion solution in low-boiling alcohols (from DuPont), by distilling off the alcohols and dissolving the Nafion in dipropylene glycol. The catalyst was suspended in this solution.

A 30 μm thick polymer electrolyte membrane, which was supported on one surface with a laminated film of polyester, was first coated on the readily accessible surface with the anode ink. A water repellent carbon fiber paper (Toray TGPH-060; thickness 200 μm) was laid on the still moist anode layer. Then the composite of membrane, anode layer and gas distribution layer was formed in a two-step drying procedure at 70 and 90° C. Finally, the composite was washed in hot water at 80° C. The platinum loading in the final anode layer was 0.21 mg Pt/cm$^2$.

In a separate working procedure, a second gas distribution layer (water repellent carbon fiber paper; Toray TGPH-060) was coated with the cathode ink and dried in two steps at 70 and 90° C. Then the cathode layer was laid on the second surface of the membrane, after removing the support film, and the composite was formed by hot-pressing at 130° C. and a pressure of 70 bar. The cathode layer had a platinum loading of 0.37 mg/cm$^2$.

EXAMPLE 2

In this example, the cathode ink was made up substantially with organic solvents (dipropylene glycol) and the anode ink was made up substantially with water. The composition of the inks is given below:

Composition of the cathode ink:

| | |
|---|---|
| 11.0 g | Pt supported catalyst (40 wt. % Pt on carbon black, Degussa-Hüls) |
| 36.0 g | Nafion ® solution (10 wt. % in dipropylene glycol (PG) |
| 11 g | Water (fully deionised) |
| 42.0 g | Dipropylene glycol |
| 100.0 g | |

Composition of the anode ink:

| | |
|---|---|
| 11.0 g | PtRu supported catalyst (40 wt. % PtRu on carbon black: 26.4 wt. % Pt, 13.6 wt. % Ru; catalyst according to U.S. Pat. No. 6,007,934) |
| 41.0 g | Nafion ® solution (10 wt. % in water) |
| 36.0 g | Water (fully deionised) |
| 10.0 g | Dipropylene glycol |
| 100.0 g | |

A 30 μm thick polymer electrolyte membrane, which was supported on one surface by a laminated film of polyester, was first coated on the readily accessible surface with the cathode ink. A water repellent carbon fiber paper (Toray TGPH-060) was laid on the still moist cathode layer. Then the composite of membrane, cathode layer and gas distribution layer was formed in a two-step drying procedure at 70 and 90° C. Finally, the composite was washed in hot water at 80° C. The platinum loading in the final cathode layer was 0.26 mg Pt/cm$^2$.

In a separate working procedure, a second gas distribution layer (water repellent carbon fiber paper; Toray TGPH-060) was coated with the anode ink and dried in two steps at 70 and 90° C. Then the anode layer was laid on the second surface of the membrane, after removing the backing film, and the composite was formed by hot-pressing at 130° C. and a pressure of 70 bar. The cathode layer had a platinum loading of 0.26 mg/cm$^2$.

Electrochemical Tests

The membrane electrode assemblies produced in example 1 and example 2 were incorporated into a PEM fuel cell test cell with an active cell area of 50 cm$^2$.

In the performance tests, a gas mixture of 45% $H_2$, 31% $N_2$, 21% $CO_2$, 50 ppm CO and an airbleed of 3% air was used as the anode gas. Air was used as the cathode gas. The cell temperature was 70° C. Anode moistening was performed at 85° C. and cathode moistening at 55° C. The pressure of the gases was 1 bar (absolute). The stoichiometry of the gases was 1.1 (anode gas) and 2.0 (cathode gas).

Figure 4:
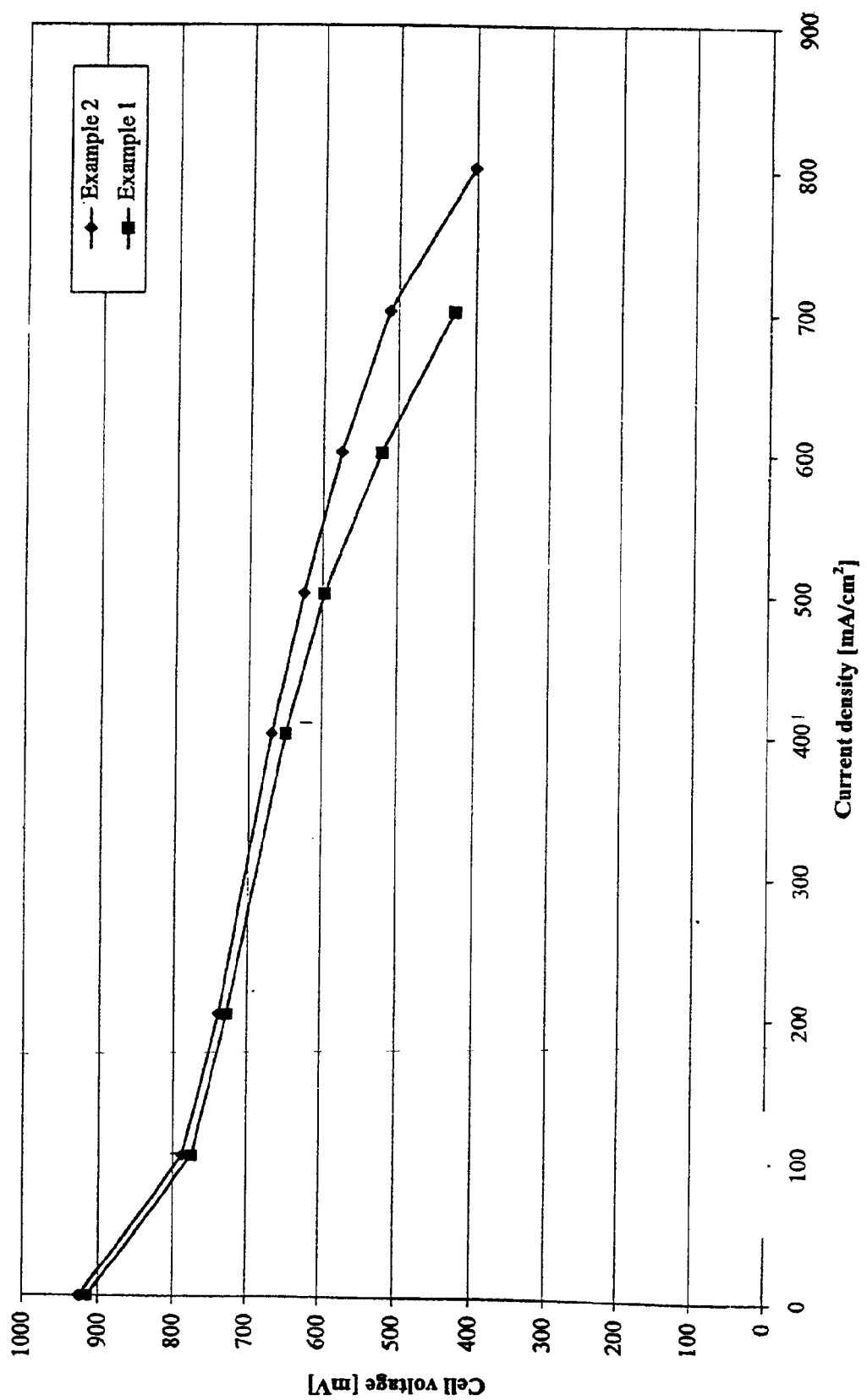
FIG. 4: Electrochemical performance data for membrane electrode assemblies produced in accordance with the invention.

The cell voltages measured when operating with air are plotted against the current density in FIG. 4. It can clearly be seen that direct coating of the cathode catalyst onto the polymer membrane (example 2) leads to better performance data of the cell over the entire current density range than direct coating of the anode catalyst onto the polymer membrane (example 1). This effect is all the more impressive since the noble metal loading in the catalyst ink in example 2 is smaller than that in example 1. Due to the solvent in the catalyst ink, there is preswelling of the polymer membrane during direct coating on the polymer membrane, which results in improved coverage of or contact with the adjacent catalyst particles. Due to the larger power losses in a fuel cell operated with hydrogen, due to overvoltage potentials at the cathode, the effect of improved linkage between catalyst and membrane on the cell performance is greater for the cathode catalyst than for the anode catalyst.

Further variations and modifications of the foregoing will be apparent to those skilled in the art and are intended to be encompassed by the claims appended hereto.

German priority application 100 50 467.1 is relied on and incorporated herein by reference.

We claim:

1. A process for producing a membrane electrode assembly for fuel cells containing a polymer electrolyte membrane having a first surface and a second surface parallel to each other, said first surface forming a firm composite with a first catalyst layer and a first water repellent gas distribution layer and said second surface forming a firm composite with a second catalyst layer and a second water repellent gas distribution layer, comprising applying said first catalyst layer to or contacting said first catalyst layer with the first surface of the polymer electrolyte membrane and applying said second catalyst layer to or contacting said second catalyst layer with the second surface of the polymer electrolyte membrane successively, wherein during the application or contacting process to one surface, always an opposite surface of the membrane is supported, said catalyst layers being prepared by using an ink containing an electrocatalyst, one at least solvent, proton-conducting ionomer and optionally a water repelling agent and a pore-forming agent.

2. The process according to claim 1, wherein a polymer electrolyte membrane is used the first surface of which is readily accessible and the second surface of which is supported by a backing film and further comprising a) producing a composite of said first surface with the first catalyst layer and the first water repellent gas distribution layer, b) removing the backing film from the second surface of the membrane, and c) producing the composite of said second surface with the second catalyst layer and the second gas distribution layer.

3. The process according to claim 2, wherein process step a) includes a1) coating the first surface of the membrane with the first catalyst layer using a first ink and a2) laying the first gas distribution layer on the still moist catalyst layer and drying the composite.

4. The process according to claim 3, wherein ink for producing the first catalyst layer contains predominantly organic solvents.

5. The process according to claim 4, wherein process step c) includes:

c1) coating the second surface of the membrane with the second catalyst layer using a second ink and c2) laying the second gas distribution layer on the still moist catalyst layer and drying the composite.

6. The process according to claim 5, wherein the ink for producing the second catalyst layer contains predominantly organic solvents.

7. The process according to claim 4, wherein process step c) includes c3) coating the second gas distribution layer with the second catalyst layer using a second ink and c4) laying the still moist catalyst layer on the second surface of the membrane and drying the composite.

8. The process according to claim 7, wherein ink for producing the second catalyst layer contains predominantly water as a solvent.

9. The process according to claim 8, wherein the first catalyst layer forms the cathode and the second catalyst layer forms the anode in the membrane electrode assembly.

10. The process according to claim 4, wherein process step c) includes c5) coating the second gas distribution layer with the second catalyst layer using a second ink and drying the coating and c6) laying the catalyst layer on the second surface of the membrane and d) compressing the entire composite at a temperature of at least 130° C.

11. The process according to claim 10, wherein ink for producing the second catalyst layer contains predominantly water as a solvent.

12. The process according to claim 11, wherein the first catalyst layer forms the cathode and the second catalyst layer forms the anode in the membrane electrode assembly.

13. The process according to claim 2, wherein process steps a) and c) further comprise a3) coating the first gas distribution layer with the first catalyst layer using a first ink and drying the coating, a4) moistening the first catalyst layer with an organic ionomer solution and a5) laying the moistened first catalyst layer on the first surface of the membrane and drying the composite, c7) coating the second gas distribution layer with the second catalyst layer using a second ink and drying the coating, c8) moistening the second catalyst layer with an organic ionomer solution and c9) laying the moistened second catalyst layer on the second surface of the membrane and drying the composite.

14. The process according to claim 13, wherein said ink for producing the catalyst layers contains predominantly water as a solvent.

15. The process according to claim 1, wherein the gas distribution layers are coated with a carbon-containing, hydrophobic microporous layer before making contact with the relevant catalyst layer.

16. The process according to claim 15, wherein the catalyst layers are washed at an elevated temperature after drying.

17. The process according to claim 1, wherein the polymer electrolyte membrane and gas distribution layers are used in the form of rolled goods and the entire process takes place continuously.

18. The process according to claim 17, wherein the catalyst layers are washed at an elevated temperature after drying.

19. The process according to claim 1, wherein the catalyst layers are applied to the polymer electrolyte membrane and gas distribution layers by spraying, brushing or printing.

20. The process according to claim 1, wherein the catalyst layers are applied to the strip-shaped polymer electrode membrane in the geometric dimensions required for fuel cells by means of screen printing and said gas distribution layers are laid precisely on the catalyst layers using sheet feeders.

21. The process according to claim 1, wherein the polymer electrolyte membrane is preswollen in water or organic solvents before application of or making contact with the catalyst layers.

* * * * *